United States Patent
Zhao et al.

(10) Patent No.: US 11,003,769 B2
(45) Date of Patent: May 11, 2021

(54) ELLIPTIC CURVE POINT MULTIPLICATION OPERATION METHOD AND APPARATUS

(71) Applicants: BEIJING SMARTCHIP MICROELECTRONICS TECHNOLOGY COMPANY LIMITED, Beijing (CN); STATE GRID INFORMATION & TELECOMMUNICATION GROUP CO., LTD, Beijing (CN); State GRID CORPORATION OF CHINA, Beijing (CN)

(72) Inventors: Dongyan Zhao, Beijing (CN); Xiaoke Tang, Beijing (CN); Yanyan Yu, Beijing (CN); Xiaobo Hu, Beijing (CN); Shiping Zang, Beijing (CN); Jie Gan, Beijing (CN); Liang Liu, Beijing (CN); Zhe Zhang, Beijing (CN); Yinzi Tu, Beijing (CN)

(73) Assignee: BEIJING SMARTCHiP MICROELECTRONICS TECHNOLOGY COMP, Beijing (CN)

( * ) Notice: Subject to any disclaimer, the term of this patent is extended or adjusted under 35 U.S.C. 154(b) by 0 days.

(21) Appl. No.: 16/970,488

(22) PCT Filed: Jun. 13, 2019

(86) PCT No.: PCT/CN2019/091161
§ 371 (c)(1),
(2) Date: Aug. 17, 2020

(87) PCT Pub. No.: WO2019/242562
PCT Pub. Date: Dec. 26, 2019

(65) Prior Publication Data
US 2020/0380122 A1    Dec. 3, 2020

(30) Foreign Application Priority Data

Jun. 22, 2018   (CN) .......................... 201810652042.1

(51) Int. Cl.
G06F 21/55      (2013.01)
G06F 7/72       (2006.01)
G06F 21/72      (2013.01)

(52) U.S. Cl.
CPC ............ G06F 21/556 (2013.01); G06F 7/725 (2013.01); G06F 21/72 (2013.01)

(58) Field of Classification Search
CPC ....... H04L 9/004; H04L 9/3066; G06F 21/72; G06F 21/556
See application file for complete search history.

(56) References Cited

U.S. PATENT DOCUMENTS

| 6,738,478 B1 * | 5/2004 | Vanstone | G06F 7/725 |
| | | | 380/28 |
| 2003/0123656 A1 * | 7/2003 | Izu | G06F 7/725 |
| | | | 380/30 |

(Continued)

FOREIGN PATENT DOCUMENTS

| CN | 101183945 A | 5/2008 |
| CN | 101562522 A | 10/2009 |

(Continued)

OTHER PUBLICATIONS

International Search Report and the English translation of the International Search Report as cited in the international application No. PCT/CN2019/091161, dated Sep. 17, 2019, 5 pages.

(Continued)

*Primary Examiner* — Dao Q Ho
(74) *Attorney, Agent, or Firm* — Cooper Legal Group, LLC

(57) ABSTRACT

Disclosed are an elliptic curve point multiplication operation method and apparatus. The elliptic curve point multiplica- (Continued)

tion operation method comprises ordered point multiplication and point addition operations. In a point addition operation process, when scanning that a current bit of a scalar K is not 0, a true point addition operation is executed, and when scanning that the current bit of the scalar K is 0, an equivalent point conversion operation is executed; the result of the true point addition operation and the result of the equivalent point conversion operation are stored in an identical register file, the register file comprising multiple registers. According to the elliptic curve point multiplication operation method and apparatus, side channel analysis and security error attack can be effectively resisted.

6 Claims, 2 Drawing Sheets

(56) References Cited

U.S. PATENT DOCUMENTS

| | | | | |
|---|---|---|---|---|
| 2005/0152541 | A1* | 7/2005 | Takenaka | G06F 7/725 380/28 |
| 2006/0056619 | A1* | 3/2006 | Billet | H04L 9/3066 380/28 |
| 2006/0093137 | A1* | 5/2006 | Izu | H04L 9/003 380/30 |
| 2008/0025500 | A1* | 1/2008 | Izu | G06F 7/725 380/28 |
| 2008/0049931 | A1* | 2/2008 | Vasyltsov | H04L 9/004 380/28 |
| 2009/0052657 | A1* | 2/2009 | Golic | G06F 7/725 380/28 |
| 2010/0067690 | A1* | 3/2010 | Han | G06F 7/725 380/44 |
| 2010/0150340 | A1* | 6/2010 | Choi | G06F 7/725 380/28 |
| 2018/0062843 | A1 | 3/2018 | Gopal | |
| 2018/0101362 | A1 | 4/2018 | Servant et al. | |

FOREIGN PATENT DOCUMENTS

| | | |
|---|---|---|
| CN | 102387015 A | 3/2012 |
| CN | 104579651 A | 4/2015 |
| CN | 105991292 A | 10/2016 |
| CN | 107425974 A | 12/2017 |
| CN | 108875416 A | 11/2018 |

OTHER PUBLICATIONS

Written Opinion and the English translation of the Written Opinion of the International Search Authority in the international application No. PCT/CN2019/091161, dated Sep. 17, 2019, 8 pages.
First Office Action and the English Translation of the First Office Action of the Chinese application No. 201810652042.1, dated Nov. 28, 2019, 15 pages.
Second Office Action and the English Translation of the Second Office Action of the Chinese application No. 201810652042.1, dated Jan. 19, 2020, 8 pages.
Notice of Allowance and the English Translation of the Notice of Allowance of the Chinese application No. 20180652042.1, dated Apr. 8, 2020, 5 pages.

* cited by examiner

ELLIPTIC CURVE POINT MULTIPLICATION OPERATION METHOD AND APPARATUS

CROSS-REFERENCE TO RELATED APPLICATION

This application claims priority to Chinese patent application No. 201810652042.1 filed on Jun. 22, 2018, the disclosure of which is hereby incorporated by reference in its entirety.

TECHNICAL FIELD

This application relates to the field of cryptographic chips, and in particular to an elliptic curve point multiplication operation method and apparatus.

BACKGROUND

Since Neal Koblitz and Victor Miller independently introduced elliptic curves into cryptography in 1985, elliptic curves have played an increasingly important role in the cryptography. There are many methods to implement elliptic curve point multiplication operations. Common point multiplication operations include a binary scanning method, a fixed window scanning method, and the like.

With the continuous advancement of measuring technologies and attacking technologies, various analysis and attacking methods for cryptographic algorithms are no longer limited to the algorithm itself, and many attacking methods for cryptographic algorithm implementation carriers have emerged. Side channel attack is one of the more threatening methods. An attacker uses side information, such as power consumption, time, electromagnetic radiation, and the like, leaked by cryptographic equipment in operation to conduct the side channel attack on cryptographic systems.

The information disclosed in the background is only intended to increase the understanding of the overall background of this application, and should not be taken as an acknowledgement or in any way suggesting that this information constitutes the related art that is well known to those of ordinary skill in this field.

SUMMARY

The objectives of embodiments of this application are to provide an elliptic curve point multiplication operation method and apparatus, which can effectively resist a side channel analysis attack and a safe-error attack.

In order to realize the above objectives, an embodiment of this application provides an elliptic curve point multiplication operation method which is configured to resist a side channel analysis attack and a safe-error attack of an attacker on ciphers in an elliptic curve cryptographic algorithm. The method may include: an ordered point multiplication operation is performed on a point Q; a point addition operation is performed on the point Q, in response to scanning that a current bit of a scalar K is not 0, a true point addition operation is performed on the point Q, and in response to scanning that the current bit of the scalar K is 0, an equivalent point conversion operation is performed on the point Q, where the scalar K is an integer in a binary form or a multi-ary form; and results of the true point addition operation and results of the equivalent point conversion operation are stored in a same register file including a plurality of registers.

In some embodiments, the true point addition operation may include a plurality of true point addition sub-operation steps, the equivalent point conversion operation may include a plurality of equivalent point conversion sub-operation steps, and a number of the true point addition sub-operation steps may be identical with a number of the equivalent point conversion sub-operation steps.

In some embodiments, in response to the true point addition operation and the equivalent point conversion operation respectively performing a true point addition sub-operation and an equivalent point conversion sub-operation in a same step, both the two sub-operations in the same step may perform addition and subtraction operations or may perform a multiplication operation.

In some embodiments, in response to the true point addition operation and the equivalent point conversion operation respectively performing a true point addition sub-operation and an equivalent point conversion sub-operation in a same step, operation results generated by the two sub-operations in the same step may be stored in a same register in the register file.

An embodiment of this application further provides an elliptic curve point multiplication operation apparatus which performs point multiplication operations by using a binary scanning method. The elliptic curve point multiplication operation apparatus may include an ordered point multiplication operation module, a scanning module, a true point addition operation module and an equivalent point conversion operation module. The ordered point multiplication operation module may be configured to perform an ordered point multiplication operation on a point Q. The scanning module may be configured to scan a scalar K which is an integer in a binary form or a multi-ary form. The true point addition operation module may be coupled with the scanning module and the ordered point multiplication operation module and may be configured to perform a true point addition operation on the point Q in response to scanning that a current bit of the scalar K is not 0. The equivalent point conversion operation module may be coupled with the scanning module and the ordered point multiplication operation module and may be configured to perform an equivalent point conversion operation on the point Q in response to scanning that the current bit of the scalar K is 0. A storage module may be coupled with the ordered point multiplication operation module, the true point addition operation module and the equivalent point conversion operation module. The storage module may be configured to store results of the true point addition operation and results of the equivalent point conversion operation in a same register file including a plurality of registers.

In some embodiments, the true point addition operation module may include N true point addition operation sub-operation units which are respectively configured to perform each of sub-operation steps of the true point addition operation, and after the N true point addition operation sub-operation units perform corresponding sub-operations, results of the true point addition operation may be generated. The equivalent point conversion operation module may include N equivalent point conversion operation sub-operation units which are respectively configured to perform each of sub-operation steps of the equivalent point conversion operation, and after the N equivalent point conversion operation sub-operation units perform corresponding sub-operations, results of the equivalent point conversion operation may be generated.

In some embodiments, in response to the sub-operation step of the true point addition operation being identical with the sub-operation step of the equivalent point conversion operation, both the two sub-operations in the identical steps may perform addition and subtraction operations or may perform a multiplication operation.

In some embodiments, in response to the sub-operation step of the true point addition operation being identical with the sub-operation step of the equivalent point conversion operation, operation results generated by the two sub-operations in the identical steps may be stored in a same register in the register file.

An embodiment of this application further provides a computer-readable storage medium configured to store a computer program which causes a computer to perform the above elliptic curve point multiplication operation methods.

An embodiment of this application further provides a processing device, including a processor and a memory. The memory may be configured to store a computer program, and the processor may be configured to call and run the computer program stored in the memory to perform the above elliptic curve point multiplication operation methods.

Compared with the related art, the elliptic curve point multiplication operation method and apparatus according to the embodiments of this application have the advantages that when the current bit of the scalar K is 0, the equivalent point conversion operation is performed, each of the sub-operation steps of the equivalent point conversion operation and the true point addition operation executes the algorithm in a same operation manner, which is equivalent to "pseudo" point addition, and then, the attacker cannot distinguish the true point addition operation and the "pseudo" point addition operation from side channel information, such as power consumption, thereby effectively resisting the side channel attack. Furthermore, the results of the equivalent point conversion operation are updated in a true operation result register, and there is no redundant operation in this process, thereby effectively resisting the safe-error attack.

DETAILED DESCRIPTION

Figure 1:
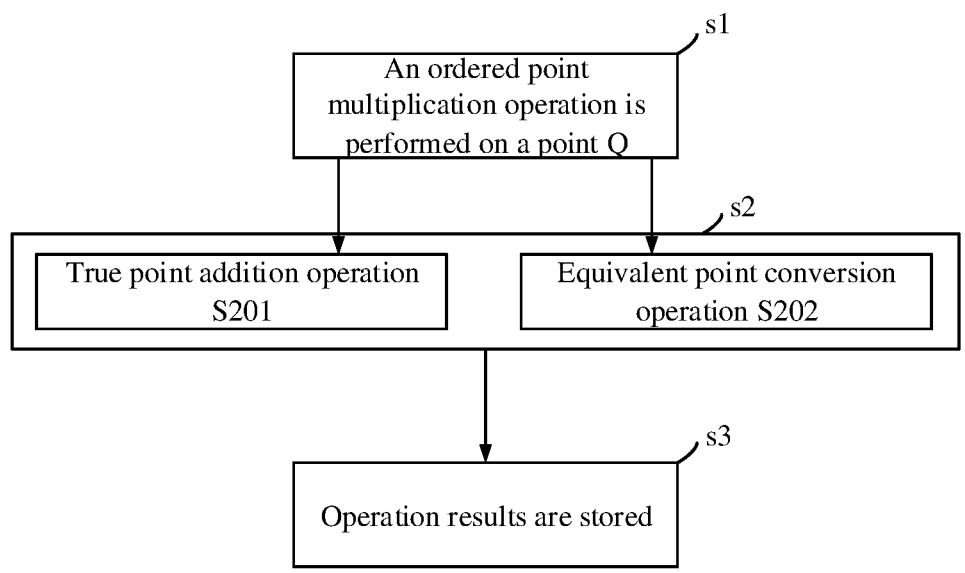
FIG. 1 is a flow chart of an elliptic curve point multiplication operation method according to an embodiment of the application.

The specific embodiments of this application are described in detail below with reference to the drawings, but it should be understood that the scope of protection of this application is not limited by the specific embodiments.

Unless otherwise expressly stated, throughout the specification and claims, the term "including" or variations thereof such as "containing" or "involving" will be understood to include the stated elements or components, but not to exclude other elements or components.

In order to facilitate understanding of the technical solutions of embodiments of this application, the related technologies of the embodiments of this application will be described below first.

An elliptic curve on/over a finite field Fq is a set including points. The elliptic curve over the finite field forms a finite abelian/commutative group under the point addition operation. K is set to be a positive integer and P is set to be a point on the elliptic curve, and the k-fold addition of the point P is called k times point multiplication operation of the point P, which is recorded as multi-point (point multiplication) Q=[k]P.

Similar to the exponentiation operation in a finite field multiplicative group, the elliptic curve point multiplication operation constitutes a one-way function. In the point multiplication operation, the multi-point Q and the base point P are known, and the problem of solving the multiple k is called the elliptic curve discrete logarithm problem. For the discrete logarithm problem of general elliptic curves, there is currently only a solution method of exponential calculation complexity. Compared with a large number decomposition problem and the discrete logarithm problem over the finite field, the elliptic curve discrete logarithm problem is much more difficult to solve. Therefore, with the same level of security requirements, elliptic curve ciphers require a much smaller key size than other public key ciphers.

There are many methods to implement elliptic curve point multiplication operations. Common point multiplication operations include a binary scanning method, a fixed window scanning method, and the like.

Since the operation logic of the fixed window scanning method is similar to that of the binary scanning method, taking a binary scanning method from left to right as an example, an existing point multiplication algorithm is introduced as follows.

The First Algorithm

Input: point P, binary representation of integer k is $k=\Sigma_{i=0}^{n-1} k_i 2^i$, $k_i \in \{0,1\}$.

Output: Q=[k]P.

Steps:

1) Q=O;
2) executing i=n−1 to 0;
2.1) Q=[2] Q;
2.2) if ($k_i$=1), Q=Q+P;
3) returning to Q.

Taking the above algorithm as an example, since the point addition operation is performed only when $k_i$ is 1, an attacker may determine whether a current key bit is 1 or 0 by observing whether the point addition operation is performed on a power consumption curve.

At present, countermeasures against the side channel attack may be implemented by eliminating the conditional branch, and regardless of whether the current bit is 0 or 1, point multiplication and point addition operations are performed. The algorithm is as follows.

The Second Algorithm

Input: point P, binary representation of integer k is $k=\Sigma_{i=0}^{n-1} k_i 2^i$, $k_i \in \{0,1\}$.

Output: Q=[k]P.

Steps:

1) Q=O;
2) executing i=n−1 to 0;
2.1) Q=[2] Q;
2.2) if ($k_i$=1), Q=Q+P;
else Q'=Q+P;
3) returning to Q.

Although based on the second algorithm it cannot be determined whether the current bit is 0 or 1 from the power consumption curve, in the step of Q'=Q+P, since the operation result Q' does not participate in subsequent operations, it is equivalent to a redundant operation and cannot resist the safe-error attack. If the attacker changes the value of Q' through fault injection and then observes whether a final operation result is correct, if the result is correct, it means that the change of Q' does not affect the final result, the current bit is 0; otherwise, it is 1.

According to properties of an elliptic curve, for two points (x1, y1, z1) and (x2, y2, z2) in a Jacobian projective coordinate system, if there is a non-zero element u over a finite field that x1=$u^2$ x2, y1=$u^3$ y2, and z1=u z2, the two triples are equivalent and represent the same point. Accordingly, embodiments of this application provide an elliptic curve point multiplication operation method and apparatus. In an elliptic curve point multiplication operation process, when a $k_i$ bit is 0, the equivalent point conversion operation is performed. Each of the sub-operation steps of the equivalent point conversion operation and the true point addition operation executes the algorithm in the same operation mode, which is equivalent to "pseudo" point addition. Therefore, the attacker cannot distinguish the true point addition operation and the "pseudo" point addition operation based on the side channel information such as power consumption, thereby effectively resisting the side channel attack. Furthermore, the results of the equivalent point conversion operation are updated in a true operation result register, and there is no redundant operation in this process, thereby effectively resisting the safe-error attack.

FIG. 1 is a flow chart of an elliptic curve point multiplication operation method according to an embodiment of the application.

The elliptic curve point multiplication operation method includes as follows.

In s1, an ordered point multiplication operation is performed on a point Q.

In s2, a point addition operation is performed on the point Q. This process includes as follows.

When scanning that the current bit of the scalar K is not 0, a true point addition operation S201 is performed on the point Q, where the scalar K is an integer in a binary or a multi-ary form; and when scanning that the current bit of the scalar K is 0, an equivalent point conversion operation S202 is performed on the point Q.

The true point addition operation S201 includes N sub-operation steps, and results of the true point addition operation are generated after the first step to the Nth step are performed. The equivalent point conversion operation S202 also includes N sub-operation steps, and results of the equivalent point conversion operation are generated after the first step to the Nth step are performed. When a sub-operation step of the true point addition operation S201 is identical with a sub-operation step of the equivalent point conversion operation S202, both the two sub-operations in the identical steps perform addition and subtraction operations or perform a multiplication operation. Operation results generated by the two sub-operations in the identical steps are stored in a same register in a register file.

In s3, operation results are stored. The results of the true point addition operation S201 and the results of the equivalent point conversion operation S202 are stored in a same register file.

In an embodiment, a point multiplication algorithm based on a binary scanning method is as follows.

Input: point P, binary representation of integer k is k=$\Sigma_{i=0}^{n-1} k_i 2^i$, $k_i \in \{0,1\}$.

Output: Q=[k]P.

Steps:
1) Q=O;
2) executing i=n−1 to 0;
2.1) Q=[2] Q;
2.2) if ($k_i$=1), Q=Q+P;
else Q=Q; //equivalent point conversion, equivalent to "pseudo" point addition;
3) returning to Q.

In another embodiment, a point multiplication algorithm based on a fixed window scanning method is as follows.

The window length is set as w, m=$2^w$, and then, the scalar K (multi-ary number) may be expressed as:

$$k=k_{t-1}m^{t-1}+k_{t-1}m^{t-1}+ \ldots +k_1 m+k_0 (0 \leq k_i \leq 2^w).$$

A fixed window scanning method from left to right is as follows.

Input: point P, m-ary representation of integer k is k=$\Sigma_{i=0}^{t-1} k_i m^i$, $0 \leq k_i < 2^w$.

Output: Q=[k]P.

Steps:
1) Pre-calculation:
1.1) $P_1$=P;
1.2) for i=2 to $2^w$−1 executing $$P_i = P_{i-1} + P;$$

2) Q=O;
3) executing i=t−1 to 0;
3.1) Q=[$2^w$] Q;
3.2) if ($k_i \neq 0$), Q=Q+$P_{k_i}$;
else Q=Q; //equivalent point conversion, equivalent to "pseudo" point addition;
4) returning to Q.

Figure 2:
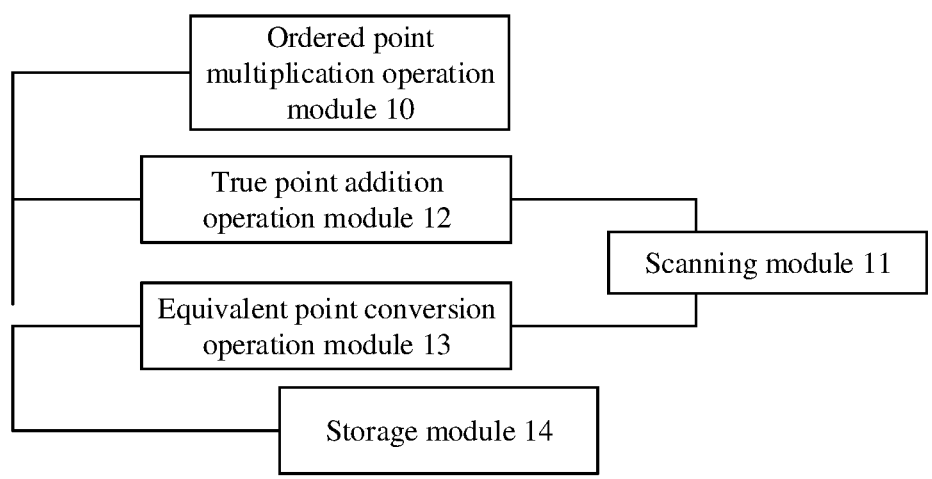
FIG. 2 is a structural diagram of an elliptic curve point multiplication operation apparatus according to an embodiment of the application.

FIG. 2 is a structural diagram of an elliptic curve point multiplication operation apparatus according to an embodiment of the application.

The elliptic curve point multiplication operation apparatus includes: an ordered point multiplication operation module 10, a scanning module 11, a true point addition operation module 12, an equivalent point conversion operation module 13 and a storage module 14.

The ordered point multiplication operation module 10 is configured to perform an ordered point multiplication operation on a point Q. The scanning module 11 is configured to scan a scalar K which is an integer in a binary form or in a multi-ary form. The true point addition operation module 12 is coupled with the scanning module 11 and the ordered point multiplication operation module 10 and is configured to perform a true point addition operation on the point Q when scanning that a current bit of the scalar K is not 0. The equivalent point conversion operation module 13 is coupled with the scanning module 11 and the ordered point multiplication operation module 10 and is configured to perform an equivalent point conversion operation on the point Q when scanning that the current bit of the scalar K is 0. The storage module 14 is configured to store results of the true point addition operation and results of the pseudo point addition operation in a same register file.

The true point addition operation module 12 includes N true point addition operation sub-operation units which are respectively configured to perform each of sub-operation steps of the true point addition operation, and after the N true point addition operation sub-operation units perform the corresponding sub-operations, results of the true point addition operation are generated. The equivalent point conversion operation module 13 includes N equivalent point conversion operation sub-operation units which are respectively configured to perform each of sub-operation steps of the equivalent point conversion operation, and after the N equivalent point conversion operation sub-operation units perform the corresponding sub-operations, results of the equivalent point conversion operation are generated. Preferably, when a sub-operation step of the true point addition operation is identical with a sub-operation step of the equivalent point conversion operation, both the two sub-operations in the identical steps perform addition and subtraction operations or perform a multiplication operation. When the sub-operation step of the true point addition operation is identical with the sub-operation step of the equivalent point conversion operation, operation results generated by the two sub-operations in the identical steps are stored in a same register in the register file.

The elliptic curve point addition and "pseudo point addition" on/over a prime field will be described in detail as an embodiment below. Operation processes are shown in the following table 1.

TABLE 1

| Step | Point addition | Pseudo point addition (equivalent point conversion operation) |
|---|---|---|
| 1 | V0 = Z1 * Z1 | V0 = X1 * X2 |
| 2 | VA = X2 * V0 | VA = X2 * Y2 |
| 3 | VC = VA − X1 | VC = Z1 + Z1 |
| 4 | V1 = V0 * Z1 | V1 = V0 * Y2 |
| 5 | VB = V1 * Y2 | VB = V1 * VC |
| 6 | VD = VB − Y1 | VD = VA + VC |
| 7 | Z1 = Z1 * VC | Z1 = Z1 * VC |
| 8 | V0 = VC * VC | V0 = X1 * VD |
| 9 | V1 = V0 * VC | V1 = V0 * VC |
| 10 | V2 = X1 * V0 | V2 = X1 * Y1 |
| 11 | V0 = VD * VD | V0 = VC * VC |
| 12 | VA = V0 − V1 | VA = VC + X1 |
| 13 | VC = VA − V2 | VC = V2 + X1 |
| 14 | X1 = VC − V2 | X1 = V1 − VB |
| 15 | V1 = V1 * Y1 | V1 = Y1 * VA |
| 16 | V2 = V2 − X1 | V2 = V1 − VC |
| 17 | Y1 = V2 * VD | Y1 = V2 * V0 |
| 18 | Y1 = Y1 − V1 | Y1 = X1 + Y1 |

Input: elliptic curve over the prime field $y^2 = x^3 + ax + b$, point Q = (X1, Y1, Z1) in Jacobian projective coordinates, and point P = (X2, Y2) in affine coordinates.
Output: point (X1, Y1, Z1) = Q + P in Jacobian coordinates It can be seen from the table that each of the sub-operation steps of the point addition and "pseudo" point addition operations are identical in the operation mode (both perform multiplication, or both perform addition/subtraction). X1, Y1, Z1, X2 and Y2 participate in operations, and the operation results of each of the sub-operation steps are updated to the same register variable V0, V1, V2, VA, VB, VC, VD or X1, Y1, and Z1.

In conclusion, according to the elliptic curve point multiplication operation method and apparatus, when a $k_i$ bit is 0, the equivalent point conversion operation is performed, and the operation mode of each of the sub-operations of the equivalent point conversion operation is identical with that of the true point addition operation, which is equivalent to "pseudo" point addition, such that the attacker cannot distinguish the true point addition operation and the "pseudo" point addition operation, so as to effectively resist the side channel attack. The results of the equivalent point conversion operation are updated in a true operation result register, and there is no redundant operation in this process, thereby effectively resisting the safe-error attack.

Those skilled in the art should understand that the embodiments of this application may provide methods, systems, or computer program products. Therefore, this application may take the form of complete hardware embodiments, complete software embodiments, or embodiments combining software and hardware. Furthermore, this application may take the form of a computer program product implemented on one or more computer-readable storage media (including but not limited to a disk memory, a compact disc read-only memory (CD-ROM), an optical memory, and the like) including computer-readable program codes. Correspondingly, an embodiment of this application further provides a computer-readable storage medium configured to store a computer program which causes a computer to perform the above elliptic curve point multiplication operation method.

A processing device provided by an embodiment of this application includes a processor and a memory. The memory is configured to store a computer program, and the processor is configured to call and run the computer program stored in the memory to perform the above elliptic curve point multiplication operation method.

This application is described with reference to flow chart and/or block diagrams of methods, apparatuses (systems) and computer program products according to the embodiments of this application. It should be understood that each flow and/or block in flow charts and/or block diagrams and a combination of flows and/or blocks in flow charts and/or block diagrams may be implemented by computer program instructions. These computer program instructions may be provided to a processor of a general-purpose computer, a special-purpose computer, an embedded processor or other programmable data processing apparatuses to produce a machine, such that the instructions executed by the processor of a computer or other programmable data processing apparatuses generate a device configured to implement the functions specified in one flow or multiple flows in flow charts and/or one block or multiple blocks in block diagrams.

These computer program instructions may also be stored in a computer-readable memory that can guide a computer or other programmable data processing apparatuses to work in a specific mode, such that the instructions stored in the computer-readable memory generate a manufactured product including an instruction device, and the instruction device implements the functions specified in one flow or multiple flows in flow charts and/or one block or multiple blocks in block diagrams.

These computer program instructions may also be loaded onto a computer or other programmable data processing apparatuses, such that a series of operation steps are performed on the computer or other programmable apparatuses to generate computer-implemented processing, and then, the instructions executed by the computer or other programmable apparatuses provide steps for implementing the functions specified in one flow or multiple flows in flow charts and/or one block or multiple blocks in block diagrams.

Finally, it should be noted that the above embodiments are only configured to illustrate the technical solutions of this application, and are not intended to limit the scope of protection thereof. Although this application is described in detail with reference to the above embodiments, it should be understand that after reading this application, those skilled in the art may still make various changes, modifications or equivalent replacements to the specific implementation manners of this application. However, these changes, modifications or equivalent replacements shall be within the scope of protection of the claims to be approved.

The invention claimed is:

1. An elliptic curve point multiplication operation method, which is configured to resist a side channel analysis attack and a safe-error attack of an attacker on ciphers in an elliptic curve cryptographic algorithm, comprising:
   performing an ordered point multiplication operation on a point Q;
   scanning a scalar K which is an integer in a binary form or a multi-ary form;

performing a true point addition operation on the point Q in response to scanning that a current bit of the scalar K is not 0;

performing an equivalent point conversion operation on the point Q in response to scanning that the current bit of the scalar K is 0; and storing results of the true point addition operation and results of the equivalent point conversion operation in a same register file including a plurality of registers; and applying the results of the true point addition operation and the results of the equivalent point conversion operation to resist a side channel analysis attack or a safe-error attack;

wherein the true point addition operation comprises a plurality of true point addition sub-operation steps, and after performing corresponding sub-operations, results of the true point addition operation are generated; and wherein the equivalent point conversion operation comprises a plurality of equivalent point conversion sub-operation steps, and after performing corresponding sub-operations, results of the equivalent point conversion operation are generated;

wherein in response to the sub-operation step of the true point addition operation being identical with the sub-operation step of the equivalent point conversion operation, operation results generated by the two sub-operations in the identical steps are stored in a same register in the register file.

2. The elliptic curve point multiplication operation method of claim 1, wherein in response to the true point addition operation and the equivalent point conversion operation respectively performing a true point addition sub-operation and an equivalent point conversion sub-operation in a same step, performing, by both the two sub-operations in the same step, addition and subtraction operations or a multiplication operation.

3. An elliptic curve point multiplication operation apparatus, comprising:

a processor coupled to a memory for executing modules;

an ordered point multiplication operation module, configured to perform an ordered point multiplication operation on a point Q;

a scanning module, configured to scan a scalar K which is an integer in a binary form or a multi-ary form;

a true point addition operation module, coupled with the scanning module and the ordered point multiplication operation module and configured to perform a true point addition operation on the point Q in response to scanning that a current bit of the scalar K is not 0;

an equivalent point conversion operation module, coupled with the scanning module and the ordered point multiplication operation module and configured to perform an equivalent point conversion operation on the point Q in response to scanning that the current bit of the scalar K is 0;

a storage module, coupled with the ordered point multiplication operation module, the true point addition operation module and the equivalent point conversion operation module and configured to store results of the true point addition operation and results of the equivalent point conversion operation in a same register file including a plurality of registers; and an applying module, configured to apply the results of the true point addition operation and the results of the equivalent point conversion operation to resist a side channel analysis attack or a safe-error attack;

wherein the true point addition operation module comprises N true point addition operation sub-operation units which are respectively configured to perform each of sub-operation steps of the true point addition operation, and after the N true point addition operation sub-operation units perform corresponding sub-operations, results of the true point addition operation are generated; and wherein the equivalent point conversion operation module comprises N equivalent point conversion operation sub-operation units which are respectively configured to perform each of sub-operation steps of the equivalent point conversion operation, and after the N equivalent point conversion operation sub-operation units perform corresponding sub-operations, results of the equivalent point conversion operation are generated;

wherein in response to the sub-operation step of the true point addition operation being identical with the sub-operation step of the equivalent point conversion operation, operation results generated by the two sub-operations in the identical steps are stored in a same register in the register file.

4. The elliptic curve point multiplication operation apparatus of claim 3, wherein in response to the sub-operation step of the true point addition operation being identical with the sub-operation step of the equivalent point conversion operation, both the two sub-operations in the identical steps perform addition and subtraction operations or perform a multiplication operation.

5. A non-transitory computer-readable storage medium configured to store a computer program which causes a computer to perform an elliptic curve point multiplication operation method, which is configured to resist a side channel analysis attack and a safe-error attack of an attacker on ciphers in an elliptic curve cryptographic algorithm, comprising:

performing an ordered point multiplication operation on a point Q, scanning a scalar K which is an integer in a binary form or a multi-ary form;

performing a true point addition operation on the point Q in response to scanning that a current bit of the scalar K is not 0;

performing an equivalent point conversion operation on the point Q in response to scanning that the current bit of the scalar K is 0; and storing results of the true point addition operation and results of the equivalent point conversion operation in a same register file including a plurality of registers; and applying the results of the true point addition operation and the results of the equivalent point conversion operation to resist a side channel analysis attack or a safe-error attack;

wherein the true point addition operation comprises a plurality of true point addition sub-operation steps, and after performing corresponding sub-operations, results of the true point addition operation are generated; and wherein the equivalent point conversion operation comprisess a plurality of equivalent point conversion sub-operation steps, and after performing corresponding sub-operations, results of the equivalent point conversion operation are generated;

wherein in response to the sub-operation step of the true point addition operation being identical with the sub-operation step of the equivalent point conversion operation, operation results generated by the two sub-operations in the identical steps are stored in a same register in the register file.

6. The non-transitory computer-readable storage medium of claim 5, wherein in response to the true point addition operation and the equivalent point conversion operation respectively performing a true point addition sub-operation and an equivalent point conversion sub-operation in a same step, performing, by both the two sub-operations in the same step, addition and subtraction operations or a multiplication operation.

\* \* \* \* \*